United States Patent
Doljack

(10) Patent No.: US 7,283,630 B1
(45) Date of Patent: *Oct. 16, 2007

(54) VERIFICATION OF AUTHENTICITY OF GOODS BY USE OF RANDOM NUMBERS

(75) Inventor: Frank A. Doljack, Pleasanton, CA (US)

(73) Assignee: Assure Systems, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/489,171

(22) Filed: Jan. 21, 2000

Related U.S. Application Data

(63) Continuation of application No. PCT/US98/15070, filed on Jul. 20, 1998, which is a continuation-in-part of application No. 08/897,857, filed on Jul. 21, 1997.

(51) Int. Cl.
*G09C 5/00* (2006.01)

(52) U.S. Cl. .................. 380/55; 235/462.01; 713/179; 705/28; 705/51; 705/52; 705/58; 705/62; 705/408

(58) Field of Classification Search .......... 235/462.01; 380/55; 705/51, 62, 28, 408, 58, 57, 52; 713/179

See application file for complete search history.

(56) References Cited

U.S. PATENT DOCUMENTS

| | | |
|---|---|---|
| 3,833,795 A | 9/1974 | Shoshani et al. |
| 4,463,250 A | 7/1984 | McNeight et al. |
| 4,879,747 A | 11/1989 | Leighton et al. |
| 4,889,365 A | 12/1989 | Chouinard |
| 4,934,846 A * | 6/1990 | Gilham ....................... 400/104 |
| 4,938,591 A | 7/1990 | Anderson et al. |
| 4,995,082 A | 2/1991 | Schnorr |
| 5,140,634 A | 8/1992 | Guillou et al. |

(Continued)

FOREIGN PATENT DOCUMENTS

EP 266748 A2 5/1988

(Continued)

OTHER PUBLICATIONS

"Point Of Sale Transaction Logging Scheme. Apr. 1980." IBM Technical Disclosure Bulletin, vol. 22, No. 11, Apr. 1980, pp. 5046-5049, XP002084211, New York, US.

(Continued)

*Primary Examiner*—Emmanuel L. Moise
*Assistant Examiner*—Paul Callahan
(74) *Attorney, Agent, or Firm*—Renner, Otto, Boisselle & Sklar, LLP

(57) ABSTRACT

Method of verifying authenticity of goods uses combination codes that have a random portion and a non-random portion that includes at least a secret portion that is encrypted. The combination codes are encrypted and may be applied to goods and checked to determine authenticity of goods; the secret portion may be encrypted with a public key and can be decrypted, for example, using a corresponding private key. The authenticity may include whether or not a tax or duty has been paid. The checking may include checking, e.g., viewing the non-random portion of the decrypted combination code to determine whether it is the same as the non-random portion used to compose the combination code.

28 Claims, 7 Drawing Sheets

U.S. PATENT DOCUMENTS

| | | | |
|---|---|---|---|
| 5,164,988 A | 11/1992 | Matyas et al. |
| 5,367,148 A | 11/1994 | Storch et al. |
| 5,422,954 A | 6/1995 | Berson |
| 5,481,610 A | 1/1996 | Doiron et al. |
| 5,540,153 A | 7/1996 | Campbell et al. |
| 5,592,561 A | 1/1997 | Moore |
| 5,598,477 A | 1/1997 | Berson |
| 5,673,338 A | 9/1997 | Denenberg et al. |
| 5,721,781 A | 2/1998 | Deo et al. |
| 5,745,678 A | 4/1998 | Herzberg et al. |
| 5,754,656 A | 5/1998 | Nishioka et al. |
| 5,768,384 A | 6/1998 | Berson |
| 5,771,392 A | 6/1998 | Razdow |
| 5,801,856 A | 9/1998 | Moghadam et al. |
| 5,818,021 A | 10/1998 | Szewczykowski |
| 5,822,739 A | 10/1998 | Kara |
| 5,845,070 A | 12/1998 | Ikudome |
| 5,850,442 A | 12/1998 | Muftic |
| 5,892,441 A | 4/1999 | Woolley et al. |
| 5,903,721 A | 5/1999 | Sixtus |
| 5,912,974 A | 6/1999 | Holloway et al. |
| 5,971,435 A | 10/1999 | Dicesare et al. |
| 6,069,955 A | 5/2000 | Coppersmith et al. |
| 6,073,114 A | 6/2000 | Perkins, III et al. |
| 6,078,888 A | 6/2000 | Johnson, Jr. |
| 6,105,004 A | 8/2000 | Halperin et al. |
| 6,108,639 A | 8/2000 | Walker et al. |
| 6,188,997 B1 | 2/2001 | Ratzenberger, Jr. et al. |
| 6,209,093 B1 * | 3/2001 | Venkatesan et al. ........ 713/176 |
| 6,212,638 B1 | 4/2001 | Lee et al. |
| 6,226,619 B1 | 5/2001 | Halperin et al. |
| 6,247,047 B1 | 6/2001 | Wolff |
| 6,252,963 B1 | 6/2001 | Rhoads |
| 6,266,416 B1 | 7/2001 | Sigbjornsen et al. |
| 6,269,445 B1 | 7/2001 | Nishioka et al. |
| 6,286,761 B1 | 9/2001 | Wen |
| 6,397,194 B1 | 5/2002 | Houvener et al. |
| 6,442,276 B1 | 8/2002 | Doljack |
| 6,681,214 B1 | 1/2004 | Doljack |

FOREIGN PATENT DOCUMENTS

| | | |
|---|---|---|
| EP | 782112 | 2/1997 |
| EP | 360225 A2 | 7/1997 |
| WO | WO8403019 | 2/1984 |
| WO | WO9322745 | 11/1993 |
| WO | WO 9803904 | 1/1998 |
| WO | WO 9904364 | 1/1999 |

OTHER PUBLICATIONS

PCT International Search Report, PCT/US98/15070, 4 pp.

Menezes, Alfred J., Paul C Van Oorschot, Scott A. Vanstone, Handbook of Applied Cryptography, 1997, p. 401.

Tygar, J.D. et al: "Cryptographic Postage Indicia", Lecture Notes in Computer Science, Springer Verlag, New York, NY, US. vol. 1179, Dec. 1996, pp. 378-391.

Vaio C1 Picturebook Notebook Computer, PCG-C1X, Sony Direct, pp. 1 to 3.

Sony Digital Cameras, Sony, pp. 1 to 2.

* cited by examiner

VERIFICATION OF AUTHENTICITY OF GOODS BY USE OF RANDOM NUMBERS

This is a continuation of PCT Patent Application No. PCT/US98/15070, filed Jul. 20, 1998, which is a continuation-in-part of U.S. patent application Ser. No. 08/897,857, filed Jul. 21, 1997.

FIELD OF THE INVENTION

The invention generally relates to a system and method for the verification of authenticity of goods. More particularly, in several embodiments the invention relates to a system and method of authenticating goods, tracking goods and/or detecting a diversion of goods via use of a random code and a used code database, encryption and/or comparison techniques.

BACKGROUND OF THE INVENTION

Products which are mass produced are distributed to end users through sales and distribution channels. When the products have particular value associated with them, counterfeiters sometimes produce products which are copies of those produced by the original manufacturers. These counterfeit products are then introduced into the sales and distribution channels and end users become deceived regarding the source of the goods and/or their quality. Lost sales occur for the original manufacturer, and the end user may receive less value than what was expected. Name brand goods, certified products and copyrighted products are often the target of such counterfeiting activities.

To address the problem of counterfeiting, one prior art solution has been to attach a label containing an optical device which is difficult to reproduce, for example, a holographic image to the products to confirm their authenticity. The original manufacturer controls these labels and their content to prevent easy access to such labels by counterfeiters. Use of such an optical device is desirable in that the authentication procedure is relatively simple, for anyone may visually inspect the label and its presence indicates authenticity. Unfortunately, this approach suffers from the weakness that skilled counterfeiters, by extending substantial effort, can reproduce these labels. Once reproduction is achieved, the counterfeiter may easily introduce a multitude of counterfeit products within the sales and distribution channels. A second disadvantage to the optical device methodology is that the creation of the special labels is relatively expensive and therefore is only cost effective for certain classes of products.

In pre-paid service areas, the use of randomly generated numbers have been utilized to validate a user prior to accessing the pre-paid service. For example, pre-paid phone card access numbers generated by random numbers have been used for such purposes. The phone card number is input into a phone or other device to validate the user prior to registering a phone call. A second application involves the use of confirmation numbers as back-up identification for electronic ticketing air fares. The use of random numbers for access of such pre-paid services, however, is substantially different than the use of optical codes for authenticating mass produced goods. For example, in the pre-paid phone card application, each random number is held secret by the user of the service, therefore a theft of the phone card or its loss may allow someone to access the pre-paid service. In the electronic air fare ticketing application, neither secrecy nor duplication of the code is of great concern since the use of the random number is only for backup identification. Knowledge of the confirmation number by a third party is unlikely to cause any loss because a third party's attempt to board an airplane flight will conflict with the boarding by the valid party. Unlike the product authentication in which previously optical devices have been used, the pre-paid service using randomly generated numbers play no role in preventing or deterring large scale loss due to counterfeiting of mass-produced goods.

In another prior art method for authentication, an apparatus is used to measure a random characteristic of a card, tag or label. The random characteristic, or "fingerprint," is read by a special reading apparatus and converted to a code which is encrypted and printed on the tag or label. The encryption ties the label to the original manufacturer of the product and the code value in turn is tied to the particular label on which it is printed since that label has the "fingerprint." This method, although secure in authenticating single labels, introduces significant costs because the label must contain special technology for the development of the "fingerprint" and a special reader must be developed and used at the time of printing the label and when the label is subsequently field checked. These shortcomings introduce significant costs in attempting to authenticate mass produced goods. It is not necessary to prevent even single counterfeits, which this method does, since the manufacturer of mass produced goods is instead interested in deterring mass counterfeiting of his product.

U.S. Pat. No. 5,367,148 discloses a method of verifying the authenticity of goods at retail outlets. Each product is provided with an identification number having random and non-random portions. The identification numbers are placed on registration cards which are read and compared to a database of identification numbers to see if the numbers are valid. The patent also uses a random number and a secret code as an identification number, wherein the secret code is calculated using an one-way hash function type algorithm.

U.S. Pat. No. 3,833,795 discloses a method for verifying the authenticity of goods by providing each good with an identification number that has random and non-random portions. Authenticity of goods is determined by maintaining the identification numbers in a master list and comparing the random number on the analyzed good with the master list.

Therefore there is a need in the art for a low cost, secure way of verifying the authenticity of mass produced goods. There is also a similar need to track goods and/or detect a diversion of goods.

SUMMARY OF THE INVENTION

In one aspect of the invention, a method of verifying the authenticity of goods includes generating one or more random codes and storing the one or more random codes in a database. The goods are marked with one of the generated random codes such that each of the goods contains its own unique random code. Upon field checking an inventory of marked goods and comparing the codes on the marked goods to codes within the database, the authenticity of goods may be verified. The field checking step may further include verifying whether the codes on the goods are valid random codes and checking whether the codes on the goods have already been used. An indication may then be provided if the random code is invalid or, if valid, it has already been used.

In another aspect of the invention, a system for verifying the authenticity of goods includes a database containing a plurality of unique random codes and an indication whether each of the unique random codes has been read, and a code reader or scanner for reading the code affixed to a good. This system further includes a comparing means for comparing a read code to the unique random codes contained within the database such that upon comparison the comparing means indicates whether the read code is valid and if valid, whether it has been read previously on another good, thereby indicating the good's authenticity.

The verification system further includes a computer for generating the plurality of unique random codes which includes a memory for containing each of the generated random codes. The computer, upon generating a random code, compares the code to a list of previously generated codes within the memory and eliminates any generated code that is a duplicate, thereby ensuring that each generated code is unique. The verification system also includes a printer, in electrical communication with the computer, for printing the generated random codes on a tag, label or directly upon the good to be marked. The printer is capable of printing either the generated code alone, or each generated code with its corresponding bar code equivalent to the tag, label or directly on the product to aid in the subsequent reading of the code. The system may further include a scanner for reading the printed codes.

In another aspect of the invention, a method of detecting diversion of goods from a desired channel or channels of distribution includes the generation of an encrypted code, wherein the code has a random portion and a non-random portion. The encryption of this code is effectuated by an encryption key wherein each encryption key is unique to a desired channel or channels of distribution. The encrypted codes are applied to goods such that each good has its own unique encrypted code. Subsequently, within the desired channel or channels of distribution, the various goods are inspected and it is verified whether the decryption key used on the code successfully reproduces the non-random portion which is uniquely dedicated for the desired channel or channels of distribution. Consequently, the method identifies whether a diversion of goods has occurred if the decryption key does not match that used on the inspected goods.

In yet another aspect of the invention, a method of verifying the authenticity of goods includes the steps of generating one or more codes each comprising a random portion and a non-random portion and encrypting each such code to thereby generate a plurality of encrypted codes. The encrypted codes are marked on or affixed to the various goods such that each good has its own unique encrypted code. At a retail distribution site, for example, the encrypted code is decrypted and read from the various goods to identify its non-random portion. A match of the non-random portion to that used originally indicates a valid code while a mismatch indicates a counterfeit. If, after the comparison, the encrypted code is a valid code, the random code may be compared to a local or secure master database to determine whether the random code has already been used or is valid.

In another aspect of the invention verification of a code and, for example, whether the goods or item with respect to which the code is used, uses a three-fold procedure, including, determining whether a code is present, determining whether the code when decrypted matches a prescribed code (such as, for example, a random number, alphanumeric, etc.), and whether the matched prescribed code is a duplicate.

In another aspect of the invention verification of a code and, for example, whether the goods or item with respect to which the code is used, uses a three-fold procedure, including, determining whether a code is present, determining whether the code when decrypted matches a prescribed code (such as, for example, a random number, alphanumeric, etc.), and whether the matched prescribed code is a duplicate; and, if a duplicate, then indicating that at least one or the other of the goods, items, etc., is a counterfeit.

In another aspect of the invention, a random number, alphanumeric or the like is obtained and a further non-random string, alphanumeric, etc. (sometimes referred to as a non-random label) is coupled therewith to provide a combination code with a random portion and a non-random portion; the combination code or string is encrypted and is applied to or associated with an object, item, good, program, etc.; and verification of authenticity of the object, etc. or of some characteristic of the object, etc. is obtained by decrypting that which was encrypted and determining whether the non-random label is found and/or is correct.

In still another aspect of the invention, a random number, alphanumeric or the like (code) is obtained and is intended to be coupled with a further non-random string, alphanumeric, etc. (sometimes referred to as a non-random label or code). The non-random code may include a portion to (sometimes referred to as a secret portion) that is to be readable (decrypted properly) only by use of a private key and a portion that is readable (decrypted properly) by a public key; or the non-random code may include only a secret portion that is to be readable (decrypted properly) by use of a special private key. The non-random code then is combined with the random code to obtain a combination code. The combination code is encrypted and is applied to or associated with an object, item, good, program, etc.; and verification of authenticity of the object, etc. or of some characteristic of the object, etc. is obtained by decrypting that which was encrypted. The decrypting may use a public key and include a verification of the random code portion of the combination code as above. The decrypting also may use a public key to decrypt the non-random portion of the combination code allowing that portion to be used for verification as above; and/or the decrypting of the seemingly non-random portion of the combination code may include decrypting of the partial decrypting of the secret portion using a public or a private key and the decrypting of the secret portion using a private key with the obtaining thereby of information contained in the secret portion.

In even another aspect of the invention, a tracking or like function may be carried out by including in the non-random portion of a combination code a secret encrypted portion containing the tracking or like function information, forming the combination code, encrypting the combination code, and applying the encrypted combination code to goods or the like.

In even another aspect of the invention, a tracking or like function may be carried out by including in the non-random portion of a combination code a secret encrypted portion containing the tracking or like function information, forming the combination code, encrypting the combination code, and applying the encrypted combination code to goods or the like; and subsequently decrypting the combination code and then the secret portion of the combination code to determine the tracking or the like information.

In a further aspect of the invention information concerning goods or the like, such as whether a tax has been paid properly, includes creating a supply of encrypted combination codes, supplying those encrypted combination codes to an entity for application to goods or the like or for association with goods or the like, decrypting the combination code using a public key, and determining whether the information concerning the goods or the like, such as the payment of a tax, has been made properly.

In a further aspect of the invention information concerning goods or the like, such as whether a tax has been paid properly, includes creating a supply of encrypted combination codes, supplying those encrypted combination codes to an entity for application to goods or the like or for association with goods or the like, destroying the codes, decrypting the combination code using a public key, and determining whether the information concerning the goods or the like, such as the payment of a tax, has been made properly.

In a further aspect of the invention information concerning goods or the like, such as whether a tax has been paid properly and/or whether the goods are counterfeit or have a counterfeit indication of such information, includes creating a supply of encrypted combination codes, supplying those encrypted combination codes to an entity for application to goods or the like or for association with goods or the like, decrypting the combination code using a public key, determining whether the information concerning the goods or the like has been made properly, and destroying or confiscating the goods if not proper or passing the goods, e.g., into commerce, if proper.

To the accomplishment of the foregoing and related ends, the invention comprises the features hereinafter fully described and particularly pointed out in the claims. The following description and the annexed drawings set forth in detail certain illustrative embodiments of the invention. These embodiments, however, are merely indicative of a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 9 is a block diagram illustrating another embodiment of the invention, using the invention to determine information, such as proper payment of a tax on cigarettes or the like, regarding goods or the like.

DETAILED DESCRIPTION OF THE INVENTION

The system and method of the following invention provides for the verification of authenticity of goods by use of random numbers. Random numbers, codes or encrypted combination codes including a random code and a non-random code are generated by a computer and subsequently produced on tags, labels or directly on products and ultimately placed within the stream of commerce. At a retail distribution outlet such as a retail store or alternatively, at any point earlier in the distribution chain, the codes are read from the marked products and compared to random codes contained within a database in which the codes are stored upon their initial generation. If the scanned product code is not verified as a valid code, the product is identified as a counterfeit. If the product code is a valid product code a further inquiry may be made to determine whether the valid code has previously been used. If the code has previously been used, the product is identified as a counterfeit; if not, an indication is made within the database that the valid code has now been used. Alternatively, the encrypted combination codes are decrypted and read to identify its non-random portion. If the decrypted non-random portion matches the originally used non-random code, goods are authenticated while a mismatch indicates a counterfeit. The present system and method allows for a cost-effective verification of authenticity of goods and provides a substantial deterrent to those who wish to counterfeit mass produced items.

Figure 1:
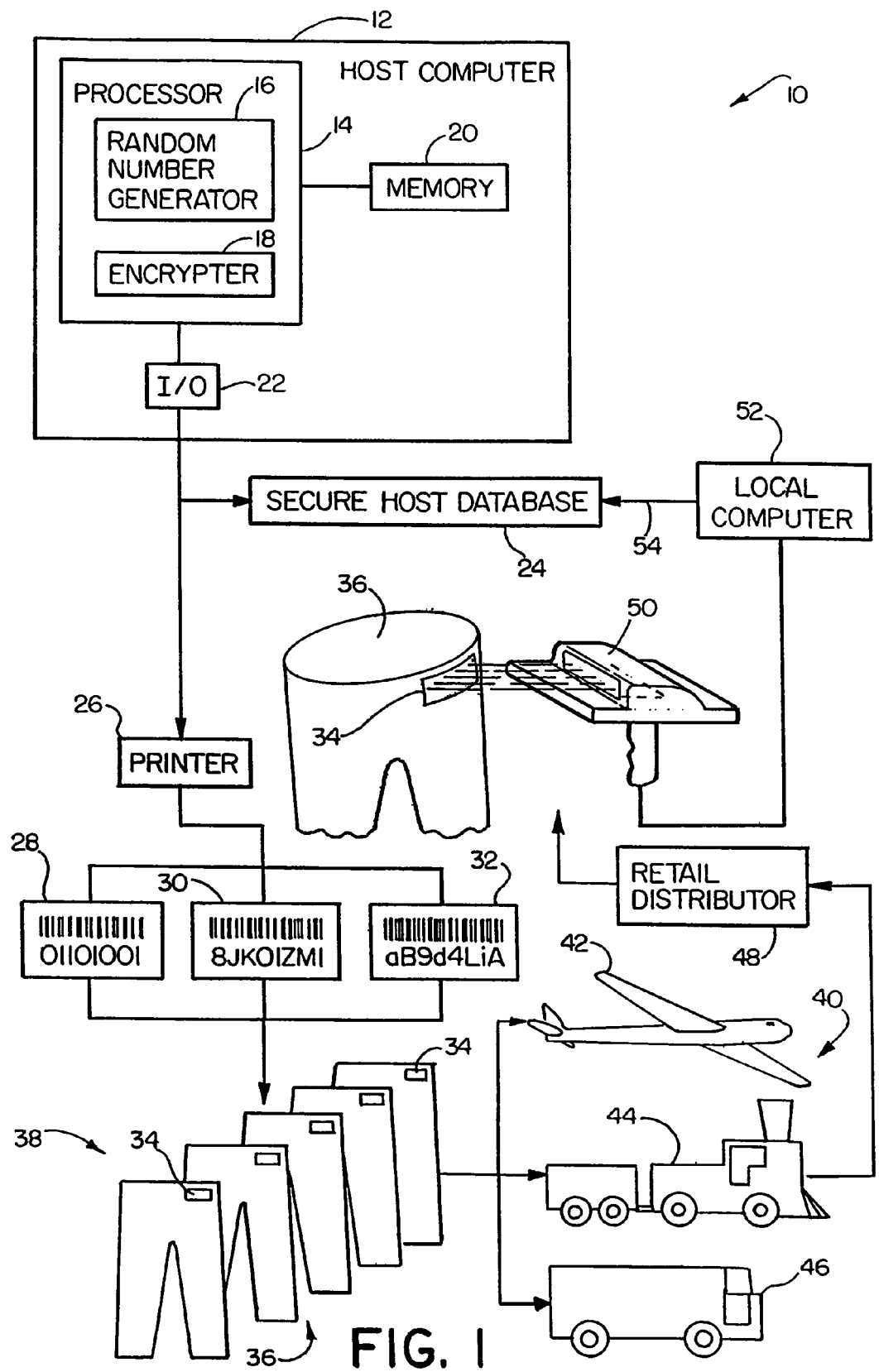
FIG. 1 is a system level diagram illustrating one embodiment of the invention, a system to generate and apply random codes to mass-produced goods and subsequently inspect the goods to verify their authenticity.

FIG. 1 is a combined system and method diagram which illustrates the various components of the present invention and provides an environmental context in which the various components are utilized; FIG. 1 therefore illustrates an authentication system 10. The authentication system 10 includes a host computer 12 having a processor 14 which contains the requisite hardware and software to provide a random number generator 16 and an encryptor 18. The processor 14 is coupled to an internal memory 20 for storage of generated random numbers or codes or alternatively for storage of various encryption algorithms to ensure that each code or encryption technique is unique. The processor 14 is also coupled to an I/O module 22 which provides input and output circuitry, drivers and interfaces to communicate with external components such as keyboards, printers and other peripherals or networks. Although the memory 20 has been illustrated as an internal memory, it should also be understood that the host computer 12 may alternatively utilize and access external memory. Upon generation of each random code, the processor 12 stores the random codes in a secure host database 24 for later access by field checkers to verify product authenticity.

The host computer 12 is coupled to a printer 26 via the I/O module 22. The printer 26 receives random codes generated by the processor 14 within the host computer 12 via the I/O module 22 and is operable to print out the random codes on various print media, for example, tags, labels or directly on various products. Depending upon the type of random code or combination code created by the random code generator 16, the printer 26 may generate a binary code 28 having a corresponding bar code for ease of reading or scanning, an alphanumeric code 30 having a corresponding bar code or alternatively a case sensitive alphanumeric code 32 with its corresponding bar code. Alternatively, other type codes may also be used. Depending upon the type of product being marked, the printer 26 generates the codes on a tag or label 34 (or alternatively directly on a product) which is then attached or affixed to the products 36, which are exemplary illustrated as the plurality of pants (clothing) which constitute a product inventory 38. Each product 36 is therefore marked with the label or tag 34, wherein each product 36 contains a unique random or combination code generated within the host computer 12. The products 36 are then distributed in commerce via various modes of transportation 40, for example, by air 42, by rail 44 or by standard freight shipping 46 to ultimately arrive at a retail distributor (or outlet) 48.

At the retail outlet 48 the label or tag 34 affixed to the product 36 is read by a tag reader (or scanner) 50 which is electrically coupled to the retail outlet's local computer 52. The local retail computer 52 is also in electrical communication with the secure host database 24 via a network-type connection 54. Various methods may be implemented utilizing the authentication system of FIG. 1; for example, the system 10 may not only verify the authenticity of mass produced products, but may also be used to identify a diversion of such products into undesired channels of distribution.

Figure 2:
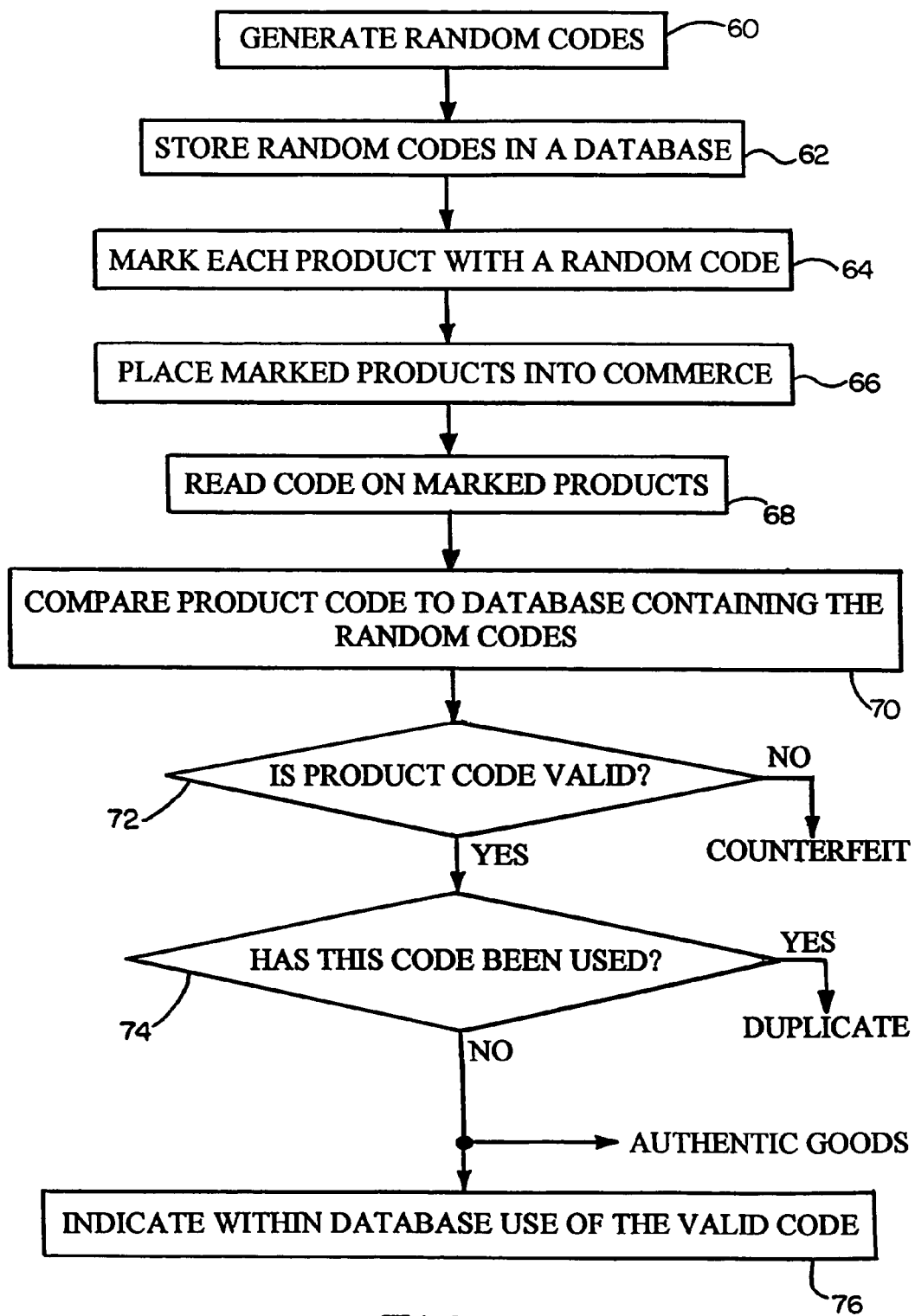
FIG. 2 is a block diagram illustrating another embodiment of the invention, using a random code applied to goods to authenticate their authenticity.

Turning now to FIG. 2, a method for verifying the authenticity of mass produced products via use of random codes utilizing the authentication system 10 of FIG. 1 will be described. At step 60, the authentication system 10 generates one or more random codes. The one or more random codes are preferably generated within the host computer 12 via a user requesting such generation via an input device such as a keyboard which is coupled to the I/O module 22 which, in turn, is coupled to the processor 14. Upon such request, the processor 14 initiates generation of such a code via the random number (code) generator 16. Upon generation, the processor 14 checks whether the generated random code has been previously generated by comparing the generated random code to previously generated codes resident within the memory 20. If the generated random code has previously been generated, the processor 14 will erase the random code and generate another. The processor 14 may look within the memory 20 for all previous products made, or alternatively, or look within various subdirectories within the memory 20 to see whether the generated random code has been previously generated for the specified product now being addressed. Otherwise, the generated code is determined to be unique. The generation of random numbers in software is well known by those skilled in the art. For example, see "Suggestions for Random Number Generation in Software" by Tim Matthews, An RSA Data Security Engineering Report, Revised Dec. 26, 1995, which is hereby incorporated by reference in its entirety.

Upon completion of the random code generation of step 60, the generated random codes are stored within the secure host database 24 at step 62. At this step, the host computer 12 has already verified that the random code is unique and sends the generated random code to the secure host database 24 via the I/O module 22. The secure host database 24 may be subsequently accessed to determine whether a valid random code read out in commerce has previously been used (which will be described in greater detail infra). After storage of the one or more random codes, each product is marked with one random code at step 64. The number of random codes required will be a function of the number of products 36 required to be marked. It is desirable that each product 36 have its own unique random code. Marking preferably is achieved by taking the generated random codes from the host computer 12 and printing them on a label 34 using the printer 26. As highlighted earlier, the random codes may be various types, for example, a binary 28, alphanumeric 30 or case sensitive alphanumeric code 32. Alternatively, other types of random codes may be utilized and fall within the scope of this invention. Upon placing a random code to each of the various labels 34, the labels 34 are affixed to the desired products 36.

Upon the completion of product marking, the marked products are placed into the flow of commerce at step 66 via any of the modes of transportation 40 which are highlighted in FIG. 1. Generally, such transportation constitutes standard freight shipping 46 such as by truck. The marked products 36 are then delivered to the retail outlet 48 where the marked products are read by a reading device or scanner 50 at step 68. Preferably, the label 34 on the product 36 is scanned by the scanner 50 upon the product's initial arrival at the retail outlet 48. Alternatively, the scanning may also be completed at a later time, for example, when the article is being purchased by a consumer. The scanner 50 scans the code on the tag 34, preferably by scanning the bar code which is a visual representation of the binary or alphanumeric random code being utilized. The scanner 50 takes the random code that has been scanned and downloads the scanned random code to the local computer 52.

The local computer 52 may be utilized for various accounting and inventory purposes in addition to the verification of authenticity of goods. In addition, the local computer 52 is in electrical communication with the secure host database 24 via either a wireless or wired network 54 or communication data link. The local computer 52, in accessing the secure host database 34, then compares the scanned random product code to those codes contained within the secure host database 24 at step 70 to verify whether the scanned random code is valid at step 72. If the scanned product code is not contained within the database 24 then the local computer 52 indicates to the individual performing the scan that the article is a counterfeit. Conversely, if the scanned product code is valid, that is, it has been found in the secure host database 24, the local computer 52 then checks the database 24 to see whether the scanned code has previously been used at step 74. If the database 24 indicates that the code has previously been used, the local computer 52 indicates to the user that the code is a duplicate. In this instance, one of two possibilities exist: either the present goods scanned are a counterfeit, or the product is authentic and the previously used code was attached to a counterfeit article. In either case, evidence of illegal counterfeiting activity has been uncovered. If the local computer 52, after analyzing the database 24, determines that the code has not previously been used, it indicates to the user that the goods are authentic and additionally indicates within the database 24 that a valid code has now been used at step 76. In this manner, the above method verifies the authenticity of to mass produced products through use of random codes placed on the articles which are subsequently checked against a secure database whether the articles are at their retail outlet or perhaps at an intermediary wholesale location.

The effectiveness of the above-described method may be more fully appreciated through the following discussion of the method of FIG. 2. Suppose, for example, the type of random code chosen is a 64 bit binary code. The number of possible 64 bit binary codes is $2^{64}$, which is $1.8 \times 10^{19}$ different numbers. Further suppose that a manufacturer wishes to mark 100 million similar products to verify their authenticity. 100 million unique 64 bit codes are then randomly chosen, stored in the secure database 24, and then each unique random code is applied to each respective product in a form which is preferably removal-resistant and perhaps even tamper-evident. Because this application of a product marking to the product itself is normally done, no significant incremental cost is associated with this operation. Further, since 100 million mass produced products have been marked and $1.8 \times 10^{19}$ different codes are available, the probability of a counterfeiter guessing one of the used random codes is only 1 in $1.8 \times 10^{11}$. Therefore it is virtually impossible for a counterfeiter to come up with a significant number of valid codes without extending a considerable amount of effort and expense. For example, a counterfeiter must go to various retail outlets 48 and copy a number of valid random codes. This is an expensive and laborious process and further subjects the counterfeiter to potential discovery in the copying process. Additionally, whenever a counterfeiter applies a code which has been copied from products out in the field to his counterfeit products, the counterfeiter ends up labeling the product with a duplicate code. As already shown, all duplicates in the above method will be discovered which allows for subsequent investigation as to the source of the counterfeit product to identify the counterfeiter.

Even if the counterfeiter wishes to risk being identified by copying valid to codes from the field, the counterfeiter must send someone into the retail outlets to copy valid codes from products already out in the stream of commerce. Suppose, for example, he extends considerable time and effort and gathers 1,000 valid codes. If he then produces one million counterfeit products he will use each of the 1,000 valid codes 1,000 times. He must then disguise his product by carefully mixing the marked items so that, once in the sales channel, field inspection is less likely to discover the duplicate at the same inspection site. This greatly complicates a counterfeiters logistics as well as his cost, thereby discouraging such counterfeiting activities. Furthermore, since multiple retail outlets will also access the database 24, even distributing the various codes to different outlets will still result in the duplicates being identified. Therefore, the care and effort taken by a counterfeiter to disguise his illegal acts only delays his discovery. Continued field checking will find the counterfeit products and will ultimately identify all the sales outlets which have or had the product. Therefore, it may be desirable for systematic field checking procedures to be put in place, for example, at the point of sale or at receipt of items at the retail outlet 48. In this manner, all counterfeit product will ultimately be intercepted and identified.

The randomly generated code may be, as in the previous example give, a 64 bit binary number. Alternatively, the random code may consist of, for example, an 8 bit alphanumeric code. These are the numbers 0 through 9 and the upper case and lower case alphabet A-Z and a-z, respectively. Since each bit of the 8 bit code can assume 62 different possibilities, there are $2.2 \times 10^{14}$ different codes possible. As in the previous example, there will only be a one in 2,182,400 chance of guessing a valid code for 100 million products. If one disregards the case sensitivity in the alphanumeric character set, this can drop to one in 28,211 chances, which is still unguessable for practical purposes. Other variations may also be used in creating the random generated code.

In the embodiment discussed with respect to FIG. 2, the authentication system 10 utilizes field checking and subsequent validation and verification of codes between the local computer 52 and the secure host database 24 via the network data link 54. Therefore in that discussion, it is evident that the database 24 interacts with the local computer 52 to the extent that codes which have been read in previous field checking are labeled as such and identified with the sales outlet in which they are found. So, when accessed from the retail outlet 48, the database 24 updates this information in addition to determining that the valid code is present in the database and is not a duplicate. In this manner, verification of product authenticity is made at the time of database access. However, this is not the only solution. Alternatively, such verification may be accomplished locally at the retail outlet 48 field check location without access to a secure master database.

Proceeding onto FIG. 3, a method of verifying the authenticity of products without accessing an off-site master database will be described in conjunction with the authentication system 10 of FIG. 1. At step 80, the generation of random codes is established in a manner similar to that described earlier in step 60 of FIG. 2; consequently, the details of such random code generation will not be repeated. At step 81, each random code is combined with a non-random code to thereby form a combination code. The non-random code may be, for example, the initials of the manufacturer, a tradename or other easily recognizable moniker or message, and combining may simply be accomplished by concatenating the initials to the end of each random code. Alternatively, the non-random code may be placed before or even interposed within the random code. Subsequent the generation of this combination code, the combination codes are encrypted at step 82 by the processor 14 within the host computer 12 which accomplishes the encryption via an internal encryptor 18. The encryptor 18, in a preferred embodiment, is a combination of processor hardware and software which allows for encryption of the generated combination codes which are developed from the random number generator 16 by concatenating each of its outputs with the non-random code. Preferably, the encryptor 18 uses an encryption key that is unique to each product manufacturer such that each manufacturer's products have their own unique encryption scheme. Preferably, the encryptor 18 uses an encryption scheme known as a public key cryptosystem. Such cryptosystems use two related keys, one for encryption and the other for decryption. One is kept private and the other is made public. After encryption, both the generated combination code (random number and its non-random portion) and its encrypted counterpart are both saved within the memory 20 for later comparison with subsequently generated random numbers to ensure that each generated random number and its encrypted counterpart are unique. After encryption, the encrypted combination code is generated via communication between the I/O module 22 and the printer 26. The printer 26 prints each encrypted combination code on a single tag so that each tag contains an encrypted combination code as well as its bar code representation. Therefore the code on each tag will consist of only an encrypted counterpart since the constant portion of the combination code is known. Again, as discussed earlier, these codes may be either a binary code 28, an alphanumeric code 30, a case sensitive alphanumeric code 32 as illustrated in FIG. 1 or any other type code.

At step 84, the tags containing the encrypted combination codes are placed on products such that each product contains its own unique encrypted combination code and each product is then placed in the stream of commerce at step 86. Upon reaching the retail distributer or outlet 48 the encrypted combination code is read at step 88 before the various products 36 are accessible to the regular consumers. The scanner 50 scans the encrypted combination code at step

88 and downloads it to the local computer 52 which contains a decryption key which is unique and provided by the manufacturer (the public key). The local computer 52 then decrypts the read encrypted code at step 90 and compares the decrypted code to the already known non-random code portion at step 92.

Figures 4, 5:
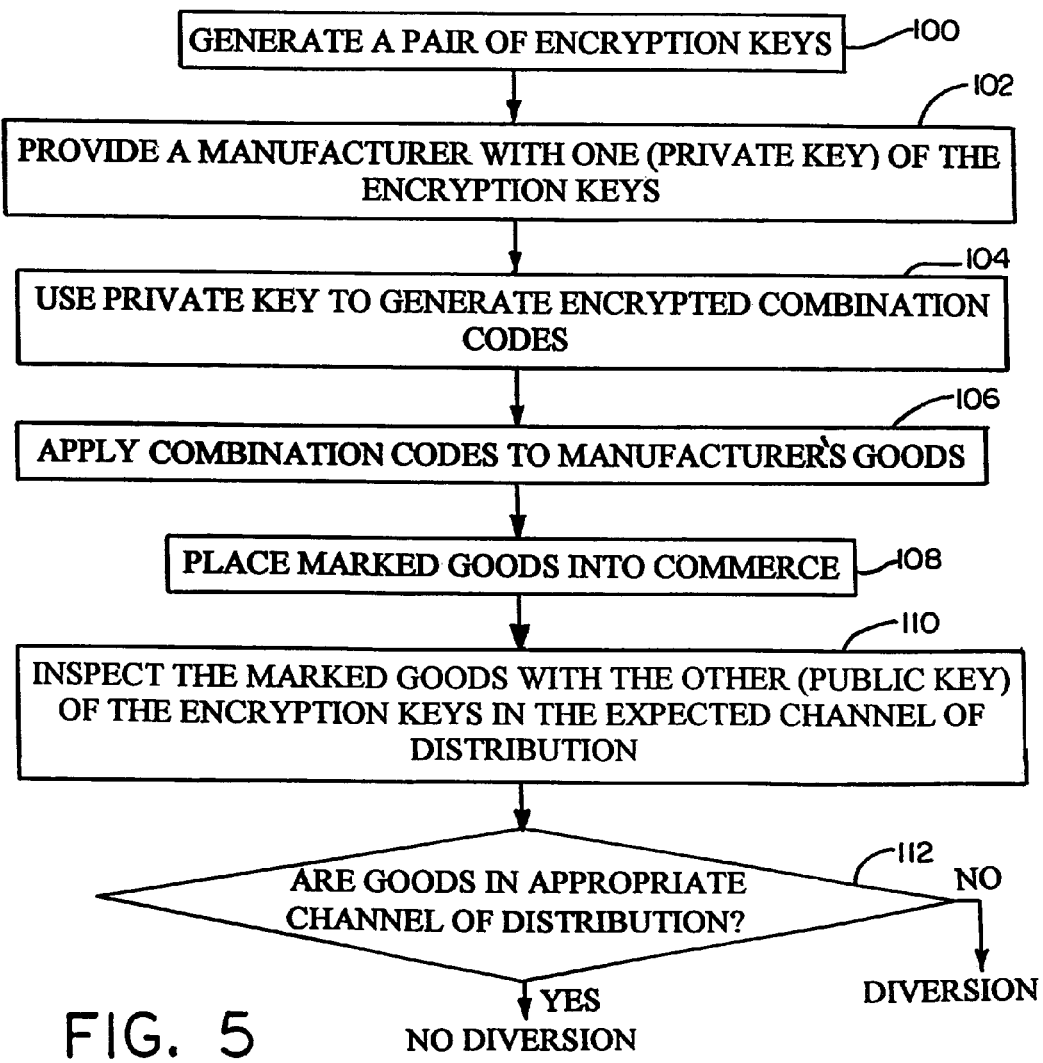
FIG. 4 is a chart illustrating the identification of a non-random portion of a decrypted combination code according to an embodiment of the present invention.
FIG. 5 is a block diagram illustrating another embodiment of the invention, using the authentication system to prevent the diversion of goods.

At step 94 the local computer 52 checks to see whether the already known non-random code portion and the decrypted code that had been read by the scanner 50 match. If the decrypted code and the non-random code portion do not match, the local computer provides an indication to the checker by either an audible or visual indicator that the product 36 is a counterfeit. The manner in which one recognizes the non-random portion of the combination code may be more easily understood in conjunction with FIG. 4. FIG. 4 is a chart 99 in which eight different encrypted combination codes have each been decrypted using a public encryption key. Note that each decrypted combination code has the same non-random code portion "YOU" at the end. Consequently, a checker can easily verify the authenticity since they know what the non-random code portion should be although the checker will not know the intricacies of the public key decryption methodology. As stated earlier, the non-random portion of the combination code may be a tradename, the manufacturer's initials, or any type of recognizable message. Alternatively, the local computer 52, after decryption, may display the decrypted code on a display portion of the scanner 50 so that the user scanning the tags can visually view the non-random code portion and thereby verify authenticity.

If a match is found, the local computer 52 checks to see whether this code has previously been scanned by the scanner 50 at step 96 by analyzing the random portion of the code which is unique for each combination code. If this code has previously been used at that locality, then the local computer 52 provides an indication that the product 36 is a counterfeit at step 96. Alternatively, a master database containing used codes may also be maintained in which various local computers 52 at various retail outlets 48 are connected together to indicate the identification of various valid codes so that the verification of whether a code has been used in step 96 may be even more extensive. Finally, at step 98, if the identified valid code has not been used the local computer 52 provides an indication to the user that the code is valid and therefore the goods are authentic and further provides an indication either within its own memory or within the master database that the code has been used for any subsequent checking.

Figure 3:
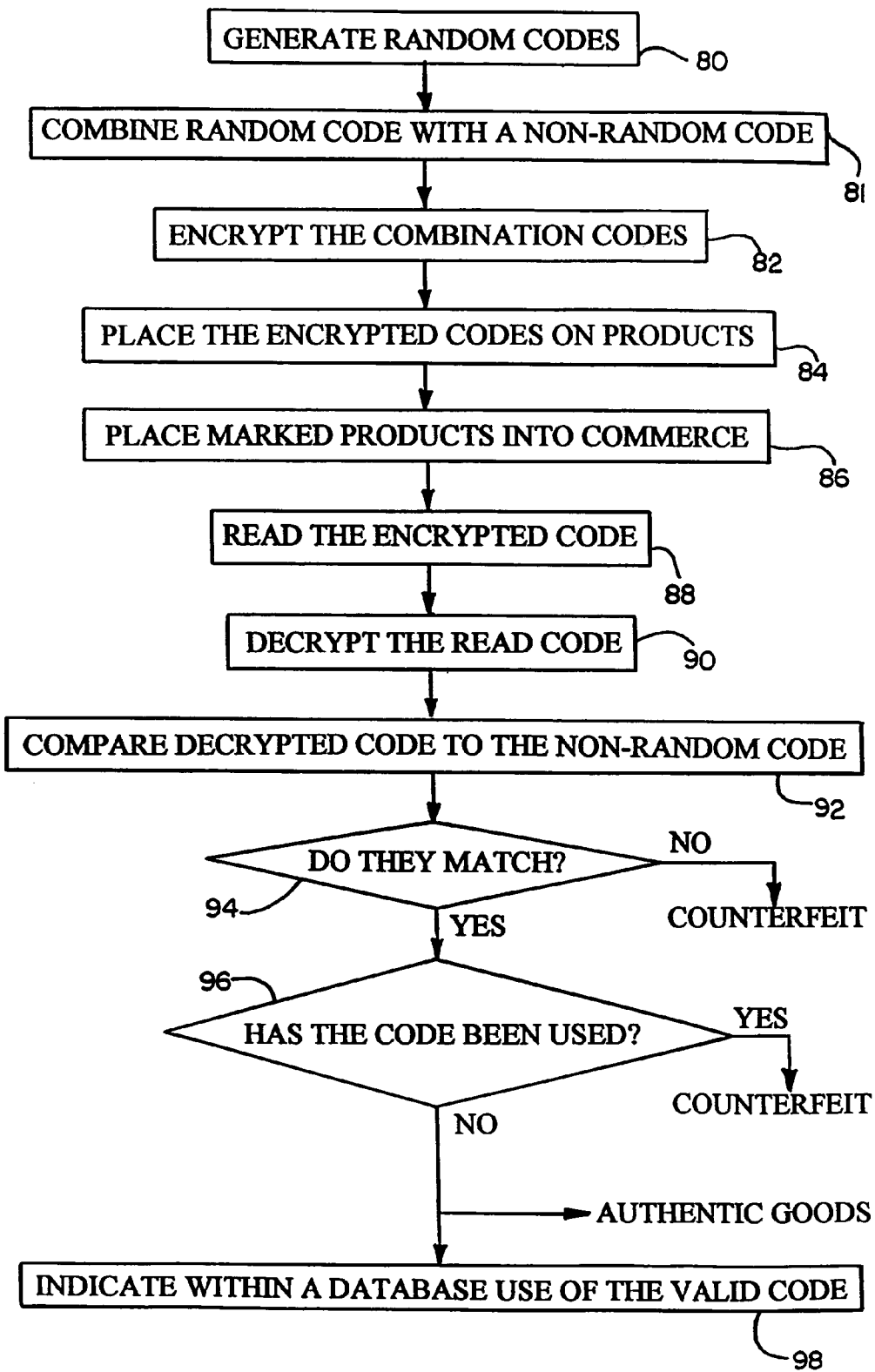
FIG. 3 is a block diagram illustrating yet another embodiment of the invention, using the system to generate encrypted codes for use in authenticating goods to thereby prevent counterfeiting.

In the above-described method of FIG. 3, a counterfeiter has few alternatives to try to defeat this method. The counterfeiter must create its own encryption method or encryption keys which will not match the encryption method or keys utilized to generate the encrypted combination codes in step 82 and therefore the decryption of the encrypted combination code will not match the already known non-random portion of the combination code in step 94 and a counterfeit will be detected. Further, if the counterfeiter chooses to copy codes after they become accessible to the public, these duplicate codes can be detected at step 96 since use of duplicate codes will be identified. Note also that a theft of the field checker's local computer 52 will not compromise the security provided by the host computer 12 since the local computer 52 contains a decryption key and a database listing of used codes. Recall that in a public key cryptosystem knowing the decryption key gives no knowledge of the encryption key. None of this information, therefore, is advantageous to the counterfeiter because it does not provide information regarding how to encrypt the codes nor does it indicate the existence of valid, presently unused codes.

The combination codes of FIGS. 3 and 4 provide an additional level of security by thwarting a counterfeiter who intercepts the field verifier (public key) and replaces them with his own verifier. If a counterfeiter steals the verifier and replaces it with one that includes the legitimate public key (obtained by analyzing the intercepted devices) and an additional bogus public key with control software, the counterfeiter will be able to inject counterfeit goods into the market that will appear valid via an analysis of the decrypted non-random code portion. However, as discussed earlier, the random code portions can be made virtually unguessable and the decrypted random code portions can be compared to a secure master database to see if the code is a valid random code that has not previously been used. Consequently, the combination provides another level of additional security, if desired.

Another alternative embodiment of the present invention relates to a method and system for identifying an undesired diversion of goods from a desired channel or channels of distribution and is illustrated in FIG. 5. The manner in which the method is performed will be discussed in conjunction with various components of the authentication system 10 of FIG. 1. At step 100, a pair of encryption keys (wherein the first, the private key, encrypts a code and the second, the public key, decrypts the encrypted code) are generated by the host computer 12. The encryptor 18 within the processor 16 generates the encryption key pairs, one key pair for each distribution channel through which the manufacturer intends to ship his goods.

After a unique pair of encryption keys are generated by the computer 12 at step 100, and wherein this unique pair of keys is associated with a particular channel of distribution through which goods are to be tracked, the private key is provided to the manufacturer of the goods at step 102 and used by the manufacturer to generate encrypted combination codes (step 104) as discussed earlier for application to the goods at step 106. The encrypted combination codes may be generated by a printer such as the printer 26 of FIG. 1 which is in electrical communication with a computer which dictates the combination code via the private encryption key. As discussed supra, the printer may apply the codes directly to the goods or alternatively may generate the codes on tags or labels for subsequent affixation to the goods. After the goods are properly marked, the goods are placed into commerce at step 108 into the particular channel of distribution via various modes of transportation (see, for example, FIG. 1, reference numerals 42, 44 and/or 46).

To determine whether a diversion of the goods into an undesired channel of distribution has occurred, an inspection of the goods within the expected channel of distribution is undertaken by the manufacturer at step 110. Inspection of the goods involves scanning the encrypted combination codes with a scanner 50 which is in electrical communication with a local computer such as computer 52 of FIG. 1 which contains the public encryption key which is associated with a particular distribution channel. At step 112, a determination is made whether or not the goods have been diverted by decrypting the encrypted combination code with the public encryption (decryption) key. If the decrypted code matches the already known non-random portion of the combination code no diversion has occurred, however, if no match is obtained, a diversion of goods from the desired channel of distribution has been discovered. Upon discovery, the manufacturer may then retrace the product shipments to identify the source of the diversion. To this end the manufacturer may use other public keys which are associated with other distribution channels to decrypt the encrypted combination code until he finds a match. In this way he can find the distribution channel into which the goods were first shipped.

Various modifications may be made to the above system and methods which also fall within the scope of this invention. For example, instead of utilizing an encryption technique on the combination codes, a digital signature of the random code may be generated by use of a one-way hash function and, in conjunction with a private key, used to calculate an encrypted number. This encrypted number along with the random number code forms a two-part code which is placed on the product. The manufacturer may now inspect this two-part code by decrypting the encrypted number with the public key to obtain the number. This number may then be compared with the number obtained by use of the one-way hash function with the random number code. If the numbers match, then the inspected product is determined to be authentic.

Figure 6:
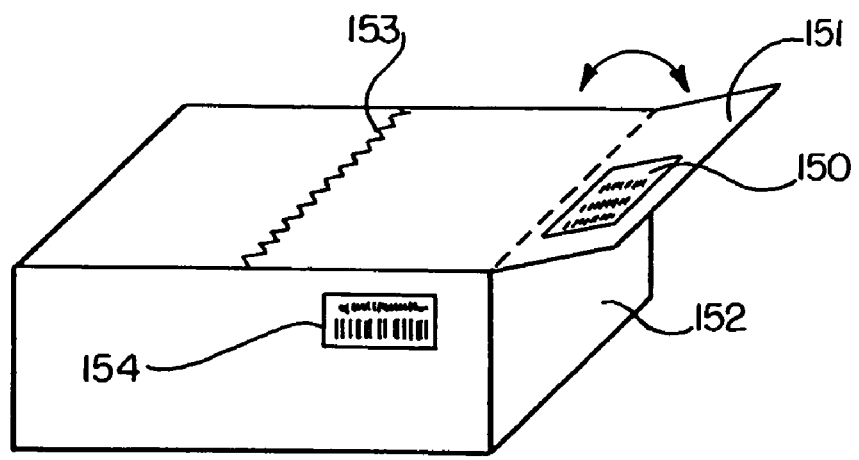
FIG. 6 is a perspective diagram illustrating goods having an encrypted combination code applied to an inside portion of a product wherein reading the code requires tampering with the product in an irreversible manner.

Another alternative is to place the random code or the encrypted combination code on the product in a location that is hidden from view such that the reading of the code can only occur by tampering with the product in an irreversible manner such that the code is tamper evident. A simple example is illustrated in FIG. 6, wherein a code 150 is affixed to an inside cover 151 of a sealed package 152. A seal 153 on the package 152 must be broken and the cover opened in order to read the code 150. Further, such reading may lower or destroy the value of the product whose code is being read. In this manner, a counterfeiter who attempts to gather valid codes from the goods within the distribution channel has an expensive task since great economic expense is incurred when attempting to copy a meaningfully large number of valid codes. Further, a manufacturer's need to check codes on products within the distribution channel in order to statistically determine a lack of duplicity is dramatically reduced. A counterfeiter will gather fewer codes as a result of the above-described added expense and it follows that his goods will have a proportionately higher number of duplicates. More duplicates makes any sampling program operated by the manufacturer more likely to find duplicates. Therefore, the manufacturer may choose to reduce his sampling program to save costs and still maintain high likelihood of discovering duplicates.

Figure 7:
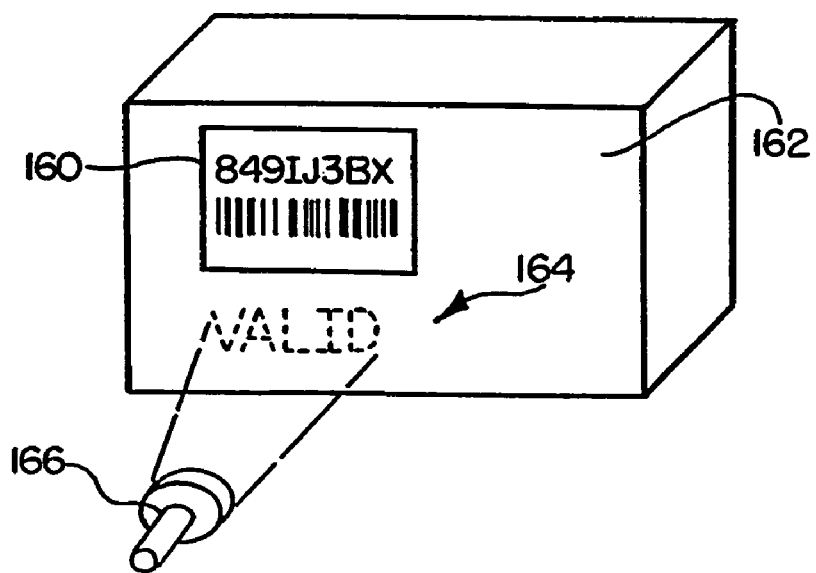
FIG. 7 is a perspective diagram illustrating a two part code, wherein one part is overt and the other is covert.

Yet another alternative embodiment is to create a two-part code such as that described in connection with the digital signature embodiment and apply the random number code overtly to the product and apply the encrypted number code covertly to the product. For example, as illustrated in FIG. 7, an encrypted code 160 may be placed on a package 162. The second code portion 164 is covert such that it is not easily detectable. Various covert type codes are contemplated. In this example, an invisible ink code is utilized which may be detected when irradiated with ultra-violet light from a UV source 166. Various other covert type coding techniques, however, are contemplated by the present invention. In another example, the encrypted code may be placed inside the package so that it is both time consuming and/or destructive (or defacing) to the product when attempting to observe it. In this manner, checking for whether the random code is a duplicate is easy since only the external code need be examined. Then, in order to check whether the goods are genuine, the manufacturer can sample a small percentage of the product. This technique makes it costly to gather a significant number of valid code pairs to mask counterfeiting activity.

Summarizing a mode of practicing the invention is to use public key encryption techniques. In this case the encryption is made with a secret, private key, and the verifying step is done by decrypting the code with the counterpart pubic key. It is well known in public key cryptography that anyone can have the public key and can inspect or verify the code because the public key gives no useful knowledge about the private key. Therefore, whoever has the public key cannot create the combination codes himself. Thus, the authenticity of the codes is assured. Only the private key holder can have created them.

It is noted that the combination codes and what they say are available to the verifier who performs the inspection. In general, the codes can be read by anyone with the public key and an exemplary utility of the system of the invention derives from the public nature of the inspection process.

However, the originator of the codes may wish to incorporate information in the combination codes which can provide the originator additional information for the purpose of tracking without generally revealing what this information is. One example of this process of the invention is a manufacturer might want to trace product from a distributor to its destination without the distributor or anyone with inspection/verification capability knowing that there is tracking information in the combination codes.

That information, such as tracking information, information as to (whether tax has been paid, as is described, or other information, can be hidden in the non-random constant portion of the combination code by a variety of useful techniques. The entire constant portion of the combination code can be a hidden message, or can be comprised of a normally readable portion with the remainder being a hidden message.

Two useful techniques to create the hidden message are secret key encryption and one way hash functions. In both cases the hidden message part of the non-random portion will appear as a meaningless string of characters. Only the originator will know that it has meaning and inspectors will know nothing of its meaning.

Figure 8:
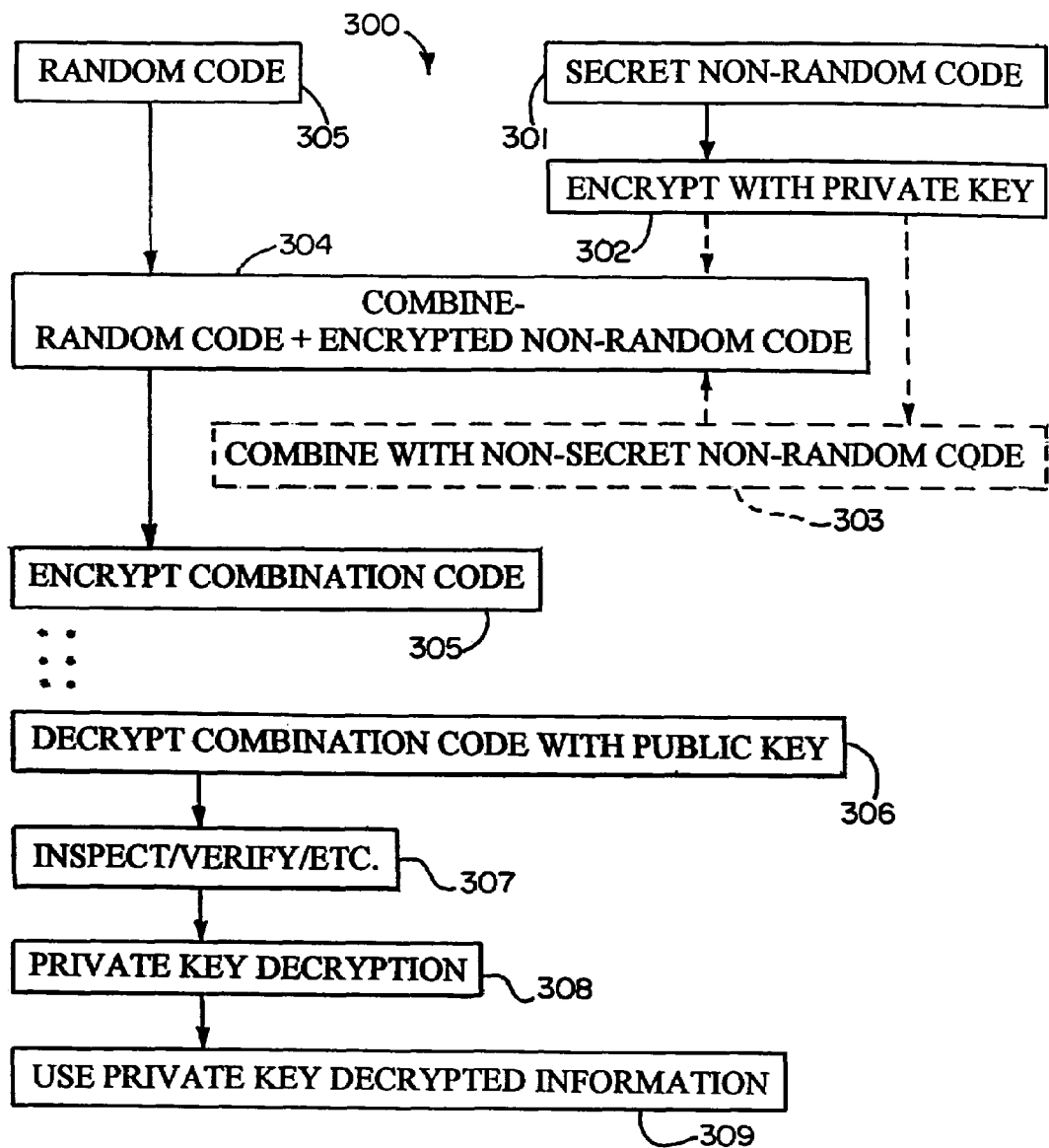
FIG. 8 is a block diagram illustrating another embodiment of the invention, using the invention to with a secret code included in an encrypted combination code.

Referring to FIG. 8, a flow chart 300 of the steps and process of this embodiment is illustrated schematically. It will be appreciated that a person having ordinary skill in the art reviewing the block diagrams and flow charts as well as the description presented in this patent application would be able to write appropriate computer program code to carry out the precesses and steps disclosed herein. In FIG. 8 a secret key encryption implementation of hidden messages in the combination codes the originator simply decides (block 301) what the secret message is for combination codes which are planned for a given destination, encrypts the message with a secret key (block 302), then adds (block 303) this message to the non-random portion of the combination code. (Block 303 is shown in dotted outline signifying that this step may be omitted if the non-random code contains only secret information/code.) This composite non-random, constant portion is subsequently used in the creation of codes specified in the invention, e.g., by combining at block 304 with a random code obtained at block 305. When codes are later inspected and ultimately sent back to the originator, the originator can use the secret key to decrypt the hidden message and use the information to decide if fraudulent activity has occurred.

In a one way hash function implementation of hidden messages the process is different as follows. One way hash functions are useful in that they can create a digest of a message which is shorter than the original message. The originator creates a message, creates the digest or hidden message from the original message by using the hash function, then saves the original message by adding it to a table of other messages that were previously used. The hidden message is used then in a combination code. When codes are sent back to the originator after inspection, the originator successively tries each original message from the table by hashing it and comparing the result to the hidden messages in the codes that are sent back. The one way hash function is not specifically illustrated in the drawings here in order to minimize the length of this patent application description; however, from the description that is presented and illustrated, it will be understood by a person who has ordinary skill in the art how to draw such a flow chart/block diagram.

The originator of the hidden message must cloak the hidden message so that those who have the ability to inspect and verify combination codes cannot begin to infer meaning to the hidden message part of the non-random code. If this part did not change from time to time and remained constant, soon this constant message would be hypothesized to have certain meanings. For example, a distributor who was being tracked by the originator by, say embedding his name in the hidden message, would soon realize that goods sent to him always had the same string of characters in a certain position within the combination code. For goods that were sent to other distributors, he would notice that this string of characters was different. He would then correctly infer that this character string corresponded to a code labeling goods sent to him alone. The originator's secret would no longer be secret at this point. Therefore, the invention preferably does not simply encode messages in a relationship with, say, random character strings, and then maintain the relationship table secret. The random character strings are the hidden messages which are used in the combination codes.

A way to thwart this discovery is to regularly change the implementation of the hidden message but not necessarily change the tracking information in the original message. If, for example, on a daily basis the originator came up with a new secret relationship table in order that the hidden message implementation changes daily, then the number of secret tables would grow to unmanageable portions in terms of storage and use. Instead, the use of encryption or one way hash functions provides a way for the hidden message implementation to change continuously but the hidden information remains constant. And there are no significant storage requirements.

As was described above, the combination code has both a random and non-random portion. In the embodiment of FIG. 8, for example, the non-random portion is comprised of a hidden message implementation and a readable portion which is usually constant, that is, the same from message to message. Instead a part of the readable portion can be a changing value. For example, this part can comprise a field of sequentially changing numbers, or it may contain the current date. The originator may now combine this information with the information he wishes to hide, and then create the hidden message using either encryption or hashing as described above. The hidden message implementation will change as often as the readable field changes. Those who inspect (blocks 306, 307) can develop no meaning from observing the hidden message implementation which is changing often. On the other hand, the originator can easily reconstruct the hidden message because he needs nothing other than either the secret (private) key (block 308) or the list of secret messages as described above, and using or noting the information obtained by the secret key decryption (block 304).

Reconstructing the hash message is straightforwardly done by using the readable field in combination with the messages from the secret list until a match is found.

To more clearly understand the usefulness of this embodiment consider the problem of cigarette tax stamps. Through the present date states of the United States and other taxing jurisdictions, such as other countries, territories and/or governmental bodies, have used the tax stamp as evidence that the tax has been paid for each pack of cigarettes bearing the stamp. These stamps have been in wide use for many years, and while they contain security features to thwart their counterfeiting, there still occurs a widespread problem of cigarette tax fraud through the counterfeiting of these stamps.

Figure 9:
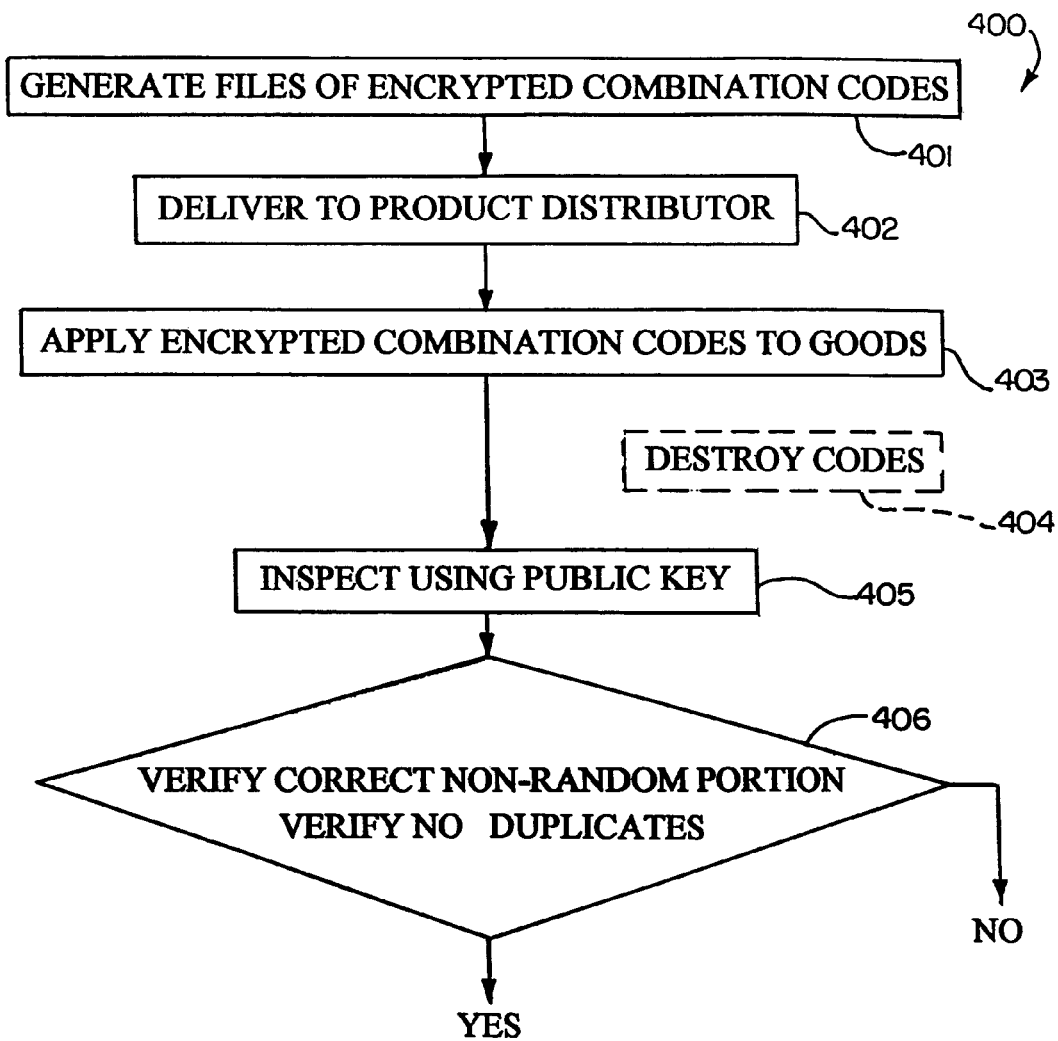

Refer to the flow chart/block diagram of FIG. 9 for this embodiment. Cigarettes or other goods are shipped to distributors who then have the responsibility to pay the state tax by buying stamps and affixing them to the packages which are then distributed in the state. Instead of affixing a stamp to each package, application of this invention will require that the distributors receive files of encrypted combination codes (block 401) from an origination source (block 402), which can be either the state or a contractor providing this service for the state. The distributor will then print the encrypted codes directly on the packages (block 403) using commercial printing equipment that has the capability to do so. Security procedures will assure that once printed the code files are destroyed (block 404) so they may not be used again.

State inspectors will be able to inspect (block 405) cigarette packages in the field using the public key (as described above) which is the counterpart to the private key which created the encrypted codes. The combination code in the original message may contain a non-random portion which is the name of the state and the value of the tax paid. Of course, if duplicates of codes are found, the inspectors have cause to immediately seize the cigarettes bearing these duplicates. Similarly, if the decryptions do not result in the message of state and tax value, the same action is warranted. This verification and checking is represented at block 406.

In addition to the state and tax value, it is useful to include the date the codes were originated for the following reasons. Suppose a counterfeiter spends resources collecting encrypted codes from cigarette packs that are out in distribution. This counterfeiter supposedly understands that he must avoid duplicate detection and therefore compiles over time as many different codes that he can possibly obtain. These codes will likely have many different dates and a good portion of the dates are likely to be old. Therefore, if an inspector encounters a container of cigarette cartons and finds many different dates including old ones, he has proof that the tax has not been paid.

Let us now suppose that the state judges that the greater threat of fraud involves the distributor who may compile codes and re-use them. Indeed, the state may wish to catch any such distributors and sets up this possibility by instead incorporating the date and distributor name within a hidden message such as described herein. The distributor's inventory, which turns over on nearly a daily basis, can be inspected by an inspector. When the inspected codes are sent to the originator, the hidden messages can be read and they will reveal whether the dates are old. The distributor's name therein constitutes proof that the distributor re-used codes.

Since the distributor could not discover that this dating was being done, he could not take any measures to hide his activity.

This is but one example where the invention described herein can be useful. It will be appreciated that the invention may be used with many other goods, items, etc., such as physical goods such as valuable products, tax stamps, documents, etc The present invention is contemplated in the context of various types of mass produced goods. Although the above examples highlighted the invention in the context of consumer goods such as clothing apparel, etc. the invention is also applicable to other type goods. For example, the present invention may be incorporated with computer software in which the coding is placed on the packaging itself or alternatively may be placed on the storage media itself such as optical media in CD-ROMs or magnetic media such as diskettes, etc. In this context the scanner is replaced by the magnetic or optical head that reads the information on the disk and performs the encryption, etc. as highlighted above.

Although the invention has been shown and described with respect to certain embodiments, other alterations and modifications will occur to others skilled in the art upon the reading and understanding of this specification and the annexed drawings. In particular regard to the various functions performed by the above elements (components, assemblies, devices, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in exemplary embodiments illustrated herein. In addition, while a particular feature of the invention may have been described above with respect to only one of several illustrated embodiments, such feature may be combined with one or more other features of the other embodiments, as may be desired and advantageous for any given or particular application.

What is claimed is:

1. A method of verifying the authenticity of goods, comprising the steps of:
   generating one or more combination codes, wherein each combination code has a random portion and a non-random portion;
   encrypting the one or more combination codes;
   associating the encrypted combination codes with one or more goods, wherein each of the goods has a unique encrypted combination code; and
   examining goods to verify whether they are authentic, wherein examining the goods comprises:
      reading the code associated with one of the one or more goods;
      decrypting the code;
      evaluating the decrypted code to verify whether the good is authentic, and
   wherein the method further includes detecting a diversion of goods from a desired channel or channels of distribution, wherein each desired channel of distribution has a unique encryption key to perform the encryption of the combination codes, and wherein examining of the goods comprises verifying whether an encryption key used for encrypting the combination codes on the inspected goods within the desired channel or channels of distribution matches the encryption key which is uniquely dedicated for the desired channel or channels of distribution, thereby identifying whether a diversion of goods has occurred.

2. The method of claim 1, wherein the step of verifying further comprises:
   inspecting the goods within the desired channel or channels of distribution;
   decrypting the codes on the goods with a decryption key; and
   examining the decrypted codes, thereby determining whether a diversion of goods has occurred.

3. The method of claim 2, wherein examining the decrypted codes comprises comparing the decrypted codes to the non-random portion of the combination codes, wherein a match indicates no diversion of goods.

4. The method of claim 1, further comprising the step generating a pair of encryption keys, wherein one key is used to encrypt combination codes and the other is used to decrypt the codes within the desired channel or channels of distribution.

5. The method of claim 4, further comprising the step of providing a manufacturer with the encryption key to encrypt combination codes.

6. The method of claim 1, further comprising the step of placing the goods into commerce after the encrypted combination codes have been associated with the goods.

7. The method of claim 2, wherein the step of inspecting the goods comprises reading the codes on the goods with a scanner.

8. The method of claim 2, wherein the step of examining the decrypted codes comprises visually examining the codes for the expected non-random portion of the combination codes.

9. A method of verifying the authenticity of goods, comprising the steps of:
   generating one or more combination codes, wherein each combination code has a random portion and a non-random portion;
   encrypting the one or more combination codes;
   associating the encrypted combination codes with one or more goods, wherein each of the goods has a unique encrypted combination code; and
   examining goods to verify whether they are authentic, wherein examining the goods comprises:
      reading the code associated with one of the one or more goods;
      decrypting the code; and
      evaluating the decrypted code to verify whether the good is authentic,
   wherein the non-random portion includes at least a secret portion that is encrypted, and
   wherein the secret portion is encrypted with a public key and can be decrypted with a corresponding private key.

10. The method of claim 9, wherein the step of generating one or more combination codes comprises the steps of:
    generating one or more random codes; and
    combining the one or more random codes with a non-random code.

11. The method of claim 10, wherein combining the one or more random codes with a non-random code is selected from the group consisting of concatenating the non-random code to an end of the random code, concatenating the non-random code to a beginning of the random code and interposing the non-random code within the random code.

12. The method of claim 9, wherein the step of examining goods further comprises the steps of:

decrypting the code associated with each of the goods; and determining whether the goods are authentic based on the decrypted code.

13. The method of claim 9, wherein the step of reading the code comprises scanning the code.

14. The method of claim 9, wherein the step of evaluating the decrypted code comprises determining whether the decrypted code contains the non-random portion of the combination codes.

15. The method of claim 14, wherein the step of determining whether the decrypted code contains the non-random portion comprises visually inspecting the decrypted code.

16. The method of claim 9, wherein the step of evaluating the decrypted code comprises comparing the decrypted code to the non-random portion of the combination codes.

17. The method of claim 16, further comprising the step of determining whether the combination code has been previously used if the random portion matches a portion of the decrypted code.

18. The method of claim 9, wherein the secret portion that is encrypted contains tracking information.

19. A method of verifying the authenticity of goods, comprising the steps of:

generating one or more combination codes, wherein each combination code has a random portion and a non-random portion;

encrypting the one or more combination codes;

associating the encrypted combination codes with one or more goods, wherein each of the goods has a unique encrypted combination code; and examining goods to verify whether they are authentic, wherein examining the goods comprises:

reading the code associated with one of the one or more goods;

decrypting the code; and evaluating the decrypted code to verify whether the good is authentic, and wherein the non-random portion of the combination code includes a secret encrypted portion containing tracking information, and wherein examining the goods comprises:

decrypting the combination code; and decrypting the secret portion of the decrypted combination code to determine the tracking information.

20. The method of claim 19, wherein associating the encrypted combination codes with one or more goods comprises applying the encrypted combination codes to the one or more goods.

21. The method of claim 19, wherein examining the goods comprises:

determining whether the code when decrypted matches a prescribed code; and indicating whether the matched prescribed code is a duplicate based on the determination.

22. The method of claim 19, wherein examining the goods comprises:

determining whether the code when decrypted matches a prescribed code; and indicating that a counterfeit has been detected if the prescribed code is a duplicate.

23. A method of preparing authenticating indicia for items, comprising composing a plurality of combination codes, each including a unique random portion and a non-random portion, and wherein the non-random portion includes at least a secret portion that is encrypted, encrypting the combination codes, and further comprising applying the encrypted combination codes to goods for use to determine whether a required tax or duty has been paid.

24. A method of checking authentication of an item identified by a respective encrypted combination code of a plurality of encrypted combination codes, each combination code including a unique random portion and a non-random portion, and wherein the non-random portion includes at least a secret portion that is encrypted, comprising checking the decrypted combination code to determine whether the non-random portion is correct, said checking comprising viewing the non-random portion of the decrypted combination code to determine whether it is the same as the non-random portion used to compose the combination code.

25. A method of checking authentication of an item identified by a respective encrypted combination code of a plurality of encrypted combination codes, each combination code including a unique random portion and a non-random portion, and wherein the non-random portion includes at least a secret portion that is encrypted, comprising checking the decrypted combination code to determine whether the non-random portion is correct, and if at the checking step the non-random portion is correct, the method further comprising further checking the decrypted combination code to determine whether the random portion of the decrypted combination code is unique.

26. The method of claim 25, further comprising storing in a database or the like the random portions of respective combination codes and an indication of whether such random portion already has been encountered as part of an encrypted combination code identified with a respective item, said further checking comprising determining whether the random portion of a decrypted combination code has already been encountered, thus indicating non-uniqueness of such random portion.

27. A method of using coded information, comprising obtaining a random code intended to be coupled with a further non-random code, obtaining a non-random code including at least a secret portion that is encrypted so as to be decrypted only by use of a private key, combining the non-random code with the random code to obtain a combination code; encrypting the combination code; applying the encrypted combination code or associating it with at least one of an object, item, good, or program; and verifying authenticity of the at least one of the object, item, good, or program or of some characteristic of the at least one of the object, item, good, or program by decrypting that which was encrypted, including decrypting the secret portion by a private key.

28. The method of claim 27, said decrypting including decrypting the combination code using a public key and subsequently decrypting the secret portion using a private key.

* * * * *

UNITED STATES PATENT AND TRADEMARK OFFICE
CERTIFICATE OF CORRECTION

PATENT NO. : 7,283,630 B1  
APPLICATION NO. : 09/489171  
DATED : October 16, 2007  
INVENTOR(S) : Doljack Page 1 of 1

It is certified that error appears in the above-identified patent and that said Letters Patent is hereby corrected as shown below:

Column 4, line 22, delete "to".

Column 8, line 55, delete "to".

Column 9, line 26, delete "to".

Signed and Sealed this

First Day of April, 2008

JON W. DUDAS  
*Director of the United States Patent and Trademark Office*